United States Patent [19]

Donnell, Jr.

[11] Patent Number: 5,599,568
[45] Date of Patent: Feb. 4, 1997

[54] ADJUSTABLE INJECTION MOLDING APPARATUS FOR CREATING OF PRODUCTS WITHIN A MOLD FROM FLUID PLASTIC MATERIAL

[76] Inventor: Emerson B. Donnell, Jr., P.O. Box 386, Basking Ridge, N.J. 07920-0386

[21] Appl. No.: 513,470

[22] Filed: Aug. 10, 1995

[51] Int. Cl.$^6$ ..................................................... B29C 45/23
[52] U.S. Cl. .......................... 425/562; 425/564; 425/566
[58] Field of Search ...................................... 425/562, 563, 425/564, 565, 566

[56] References Cited

U.S. PATENT DOCUMENTS

| | | |
|---|---|---|
| 3,436,446 | 4/1969 | Angell, Jr. . |
| 3,674,401 | 7/1972 | Annis, Jr. et al. . |
| 3,746,492 | 7/1973 | DeVita . |
| 3,988,403 | 10/1976 | Angell, Jr. et al. . |
| 3,991,147 | 11/1976 | Knipp et al. . |
| 4,107,258 | 8/1978 | Angell, Jr. et al. . |
| 4,155,969 | 5/1979 | Hendry . |
| 4,173,448 | 11/1979 | Rees et al. . |
| 4,185,070 | 1/1980 | Angell, Jr. et al. . |
| 4,212,625 | 7/1980 | Shutt . |
| 4,247,515 | 1/1981 | Olabisi . |
| 4,255,368 | 3/1981 | Olabisi . |
| 4,290,744 | 9/1981 | Dannels et al. . |
| 4,781,554 | 11/1988 | Hendry . |
| 5,164,200 | 11/1992 | Johnson . |
| 5,169,648 | 12/1992 | Eckardt et al. . |
| 5,182,118 | 1/1993 | Hehl . |
| 5,238,378 | 8/1993 | Gellert . |

*Primary Examiner*—Tim Heitbrink
*Attorney, Agent, or Firm*—Sperry, Zoda & Kane

[57] ABSTRACT

An improved design for an injection molding apparatus for creating of products from fluid plastic material wherein a hydraulic flow divider can be used for simultaneously actuating of multiple hydraulic injectors which need not be linearly positioned. This molding apparatus is usable with a hydraulic flow divider since a unique configuration of a fixed frame with a cage mounted movably therein and a hydraulic cylinder assembly mounted movably within the cage allows the injection molding apparatus to use the same amount of hydraulic fluid during each and every stroke regardless of the length of the stroke of the rod relative to the nozzle. This unique capability is achievable by allowing the hydraulic cylinder assembly in its entirety to move within a predefined cage configuration even after the entire stroke is completed in order to allow the cylinder to accept the amount of powering hydraulic fluid associated with a single complete stroke. Further included in this design is a unique position indicating device located externally on the apparatus to indicate the relative positioning internally between the nozzle rod and the nozzle rod tip opening and to indicate the positioning of adjustment thereof.

20 Claims, 5 Drawing Sheets

ADJUSTABLE INJECTION MOLDING APPARATUS FOR CREATING OF PRODUCTS WITHIN A MOLD FROM FLUID PLASTIC MATERIAL

BACKGROUND OF THE INVENTION

1. Field of the Invention

The present invention deals with the field of hydraulically powered devices for injection molding of articles. Furthermore the present design specifically is useful for multiples of such injectors all powered by a single hydraulic flow divider which provides a specific and equal volume of powering hydraulic fluid to each injector during each stroke of a cycle. The present invention further pertains to those devices including adjustment aiding apparatus and freely adjustable configurations indicated externally from the apparatus.

2. Description of the Prior Art

Numerous prior art devices have been designed for improving and allowing adjustability in injection molding apparatus such as U.S. Pat. No. 3,436,446 issued Apr. 1, 1969 to R. Angell, Jr. and assigned to Union Carbide Corporation on a "Molding Of Foamed Thermoplastic Articles"; and U.S. Pat. No. 3,674,401 issued Jul. 4, 1972 to R. Annis, Jr. et al and assigned to USM Corporation on an "Apparatus For Injection Molding Articles Of Foam Material"; and U.S. Pat. No. 3,746,492 issued Jul. 17, 1973 and assigned to Structural Foam Products, Inc. on an "Apparatus For Molding Foamed Thermoplastic Articles"; and U.S. Pat. No. 3,988,403 issued Oct. 26, 1976 to R. Angell, Jr. et al and assigned to Union Carbide Corporation on a "Process For Producing Molded Structural Foam Article Having A Surface That Reproducibly And Faithfully Replicates The Surface of The Mold"; and U.S. Pat. No. 3,991,147 issued Nov. 9, 1976 to U. Knipp et al and assigned to Bayer Aktiengesellschaft on a "Process For Molding Foamed Plastics From Reaction Mixtures Involving Closed Mold Filling With The Avoidance of Gas Bubble Entrainment"; and U.S. Pat. No. 4,107,258 issued Aug. 15, 1978 to R. Angell, jr. et al and assigned to Union Carbide Corporation on an "Injection Molding Reduced Combustibility High Impact Strength Polyethylene Articles"; and U.S. Pat. No. 4,155,969 issued May 22, 1979 to J. Hendry and assigned to Ex-Cell-O Corporation on a "Method For Injection Foam Molding"; and U.S. Pat. No. 4,173,448 issued Nov. 6, 1979 to H. Rees et al and assigned to Husky Injection Molding Systems on an "Actuating Mechanism For Gate Valve Of Injection Nozzle"; and U.S. Pat. No. 4,185,070 issued Jan. 22, 1980 to R. Angell, Jr. et al and assigned to Union Carbide Corporation on a "Process For Injection Molding Thermoplastic Articles With Reduced Combustability"; and U.S. Pat. No. 4,212,625 issued Jul. 15, 1980 to G. Shutt on a "High Speed Injector For Molding Machines"; and U.S. Pat. No. 4,247,515 issued Jan. 27, 1981 to O. Olabisi and assigned to Union Carbide Corporation on a "Process For Molding Of Plastic Structural Web Articles"; and U.S. Pat. No. 4,255,368 issued Mar. 10, 1981 to O. Olabisi and assigned to Union Carbide Corporation on a "Structural Foam Molding Process"; and U.S. Pat. No. 4,290,744 issued Sep. 22, 1981 to W. Dannels et al and assigned to Hooker Chemicals & Plastics Corp. on an "Apparatus For Runnerless Injection-Compression Molding Thermosetting Materials"; and U.S. Pat. No. 4,781,554 issued Nov. 1, 1988 to J. Hendry and assigned to Michael Ladney on an "Apparatus For The Injection Molding Of Thermoplastics"; and U.S. Pat. No. 5,164,200 issued Nov. 17, 1992 to T. Johnson and assigned to Nitrojection Corporation on a "Nozzle For Gas Assisted Injection Molding"; and U.S. Pat. No. 5,169,648 issued Dec. 8, 1992 to H. Eckardt et al and assigned to Battenfeld GmbH on an "Apparatus For Injection Molding Articles Of Thermoplastic Materials"; and U.S. Pat. No. 5,182,118 patented Jan. 26, 1993 to K. Hehl on a "Plasticizing Apparatus For Use In An Injection Molding Machine"; and U.S. Pat. No. 5,238,378 issued Aug. 24, 1993 to J. Gellert on a "Coinjection Molding Apparatus Having Rotary Axial Actuating Mechanism".

SUMMARY OF THE INVENTION

The present invention provides an improved adjustable injection molding apparatus for molding of products within a mold from fluid plastic material. The design includes a frame having a first fixed platen fixedly secured with respect to the frame as well as a second fixed platen also fixedly secured with respect to the frame at a location removed from the location of the first fixed platen. A first frame tie rod means, preferably including two individual tie rods, is fixedly secured to the first fixed platen and to the second fixed platen and extends therebetween for maintaining them in spaced orientation with respect to one another.

A fixed intermediate member is secured to the fixed frame tie rods at an intermediate position between the first fixed platen and the second fixed platen and spatially disposed from both.

A cage is included which has a first cage plate movably mounted on the first frame tie rods between the fixed intermediate member and the first fixed platen and being movable therebetween. A second cage plate is movably mounted on the fixed frame tie rods between the fixed intermediate member and the second fixed platen spatially disposed from the first cage plate. A cage tie rod configuration, preferably including four such cage tie rods, are fixedly secured to the first cage plate and to the second cage plate such as to extend therebetween. These cage tie rods include four individual such tie rods preferably positioned at each corner of the cage plates extending therebetween.

A hydraulic cylinder assembly is preferably included movably mounted to the fixed frame tie rods between the fixed intermediate member and the second cage plate in such a manner as to be movable therebetween. This hydraulic cylinder assembly preferably includes a cylinder defining a cylinder bore extending therethrough. This cylinder preferably includes a first end opening and a second end opening located at positions in the cylinder bore spatially disposed from one another.

The hydraulic cylinder preferably includes a first cylinder plate movably mounted on the fixed frame tie rods between the fixed intermediate member and the second cage plate. This first cylinder plate is preferably fixedly secured to this cylinder adjacent to the first end opening thereof. The first cylinder plate is preferably movable to a position into abutment with the fixed intermediate member. The hydraulic cylinder also includes a second cylinder plate movably mounted on the fixed frame tie rods between the fixed intermediate member and the second cage plate such as to be spatially disposed from the first cylinder plate. This second cylinder plate is fixedly secured to the cylinder means adjacent to the second end opening thereof. This second cylinder plate is movable to a position into abutment with respect to the second cage plate.

The apparatus of the present invention further includes a hydraulic cylinder rod movable with respect to the cylinder and extending through the cylinder bore and through the first end opening means thereof and the second end opening means thereof. This hydraulic cylinder rod includes a rod stop nut secured thereon outside of the cylinder bore adjacent the first end opening thereof. A nozzle rod is also included attached to the hydraulic cylinder rod and extending outwardly, and parallel away therefrom, in the opposite direction and adjacent to the second opening, in order to be movable with the cylinder rod.

A nozzle body is attached with respect to the frame and defines a nozzle channel extending therethrough in order to facilitate dispensing of thermoplastic material. This nozzle body further defines a tip opening therein which is preferably in fluid flow communication with respect to the nozzle channel in order to facilitate dispensing of thermoplastic material therethrough. The nozzle rod is preferably movably mounted within the nozzle channel for selectively allowing and preventing dispensing. The nozzle rod is selectively positionable with respect to the tip opening means to prevent dispensing therefrom when positioned therewithin.

A piston is fixedly secured to the hydraulic cylinder rod at a position within the cylinder bore. This piston is preferably reciprocally movable within the cylinder bore between a position adjacent the first end opening with the nozzle rod in the open position with respect to the tip opening to allow dispensing therethrough. The piston is also movable to a position adjacent to the second end opening within the cylinder bore, placing the nozzle rod in the closed position with respect to the tip opening to prevent dispensing.

An adjustment means is included for varying the length of the stroke of the piston, cylinder rod and nozzle rod with respect to the frame. This adjustment means preferably includes an adjustment screw lock nut positioned adjacent to the first fixed platen and defining a threaded aperture extending therethrough. An adjustment screw is positioned extending through this threaded aperture as well as extending through the first fixed platen and the first cage plate. This adjustment screw is in threaded engagement with respect to the first fixed platen to be adjustably positionable extending therethrough in order to vary the distance between the first fixed platen and the first cage plate.

An adjustable screw head is included in the adjustment apparatus which is positioned in abutment with the first cage plate at a position thereon opposite from the first fixed platen to limit movement of the first cage plate away from the first fixed platen. The adjustment screw head is spatially disposed from the rod stop nut by a distance equal to the stroke length of the piston. The adjustment screw is rotatable to adjust the relative positioning of the adjustment screw preferably with respect to the first fixed platen to adjust the stroke length of the piston relative to the frame. A compression spring biasing means may also be included extending around the adjustment screw between the first fixed platen and the first cage plate for urging them away from one another. A hex-shaped adjustment end is secured on the adjustment screw adjacent to the first fixed platen to facilitate rotational control of movement of the adjustment screw for adjusting stroke length.

A first limit switch is preferably fixedly secured to the cage and is adapted to be actuated to indicate movement of the nozzle rod to the adjustably opened position with respect to the tip opening. A second limit switch is fixedly secured to the frame at a position spatially disposed from the first limit switch and is adapted to be actuated to indicate movement of the nozzle rod to the fully closed position with respect to the tip opening.

A limit switch actuating plate is preferably secured between the hydraulic cylinder rod and the rod stop nut in such a manner as to be movable therewith. This limit switch actuating plate will preferably be movable with the hydraulic cylinder rod to a position adjacent to the first limit switch for actuating thereof responsive to movement of the nozzle rod to the adjustably opened position relative to the tip opening. The limit switch actuating plate will also be movable with the hydraulic cylinder rod to a position adjacent to the second limit switch for actuating thereof responsive to movement of the nozzle rod to the fully closed position relative to the tip opening.

A hydraulic fluid conduit is preferably positioned in fluid flow communication with respect to the cylinder to supply a fixed amount of hydraulic fluid for one operational stroke into the cylinder bore during each operational stroke of the injection molding apparatus. This hydraulic fluid as required for each stroke will be operative to drive the piston and the hydraulic cylinder rod toward the adjustment screw head until the rod stop nut moves into abutment therewith. This powering hydraulic fluid will also be operable to drive the hydraulic cylinder assembly itself toward the second cage plate for abutment therewith. The hydraulic conduit for supplying powering fluid preferably includes a first conduit means in fluid flow communication with the cylinder bore on one side of the piston and a second conduit in fluid flow communication with the cylinder bore on the opposite side of the piston from the first conduit.

A poppet device may be included secured to the hydraulic cylinder rod for facilitating securement with the nozzle rod. The poppet is also preferably engageable with a poppet seat to prevent material flow past the seat during the major portion of the injection cycle.

The present device may also include a position indicating device having an icon plate fixedly secured to the first fixed platen of the frame means. The icon plate preferably includes a marked means thereon to facilitate indicating of relative positioning between the nozzle rod and the nozzle opening.

This marked apparatus preferably includes equally spaced lines. The spaced lines will form a scale in order to facilitate position adjustment. The marked apparatus will preferably also include an inner nozzle body profile icon to facilitate display of relative positioning of the tip open area of the nozzle body with respect to the nozzle rod. The marked means further preferably includes an outer nozzle body profile icon to further represent the relative positioning between the tip opening area of the nozzle body and the nozzle rod.

The position indicating apparatus preferably includes a limit switch actuating plate extension fixedly secured to the limit switch actuating plate and extending outwardly therefrom in such a manner as to be movable therewith.

The position indicating apparatus further includes an icon rod fixedly secured to the limit switch actuating plate extension and extending outwardly therefrom to a position adjacent to the marked device on the icon plate in such a manner as to aid in indicating of the relative position between the nozzle rod and the nozzle tip opening. This icon rod will preferably extend generally parallel with respect to the hydraulic cylinder rod and the nozzle rod. The icon rod is preferably movable with the hydraulic cylinder rod and includes a first icon rod section and a second icon rod section oriented coaxially with respect to one another. The second icon rod section is fixedly secured to the limit switch actuating plate extension and is preferably smaller in diameter than the first icon rod section in order to define a step therebetween resulting from the difference in relative diameters thereby representing the end of the nozzle rod. This step is positioned adjacent to the marked means defined on the icon plate for representing positioning of the nozzle rod thereagainst. A pointer may be included in the position indicating means fixedly secured with respect to the cage to be movable therewith. This pointer means is positioned adjacent to the markings on the icon plate in such a manner as to indicate where the rod end will be relative to the tip opening, when the rod is in the open position.

It is an object of the present invention to provide an improved adjustable injection molding apparatus for molding of products within a mold from fluid plastic material wherein a specific predetermined amount of powering hydraulic fluid is used for each stroke regardless of the size of the part being molded and regardless of the positioning of adjustment of the apparatus.

It is an object of the present invention to provide an improved adjustable injection molding apparatus for creating of products within a mold from fluid plastic material wherein additional capital costs for equipment modification is minimized.

It is an object of the present invention to provide an improved adjustable injection molding apparatus for creating of products within a mold from fluid plastic material wherein equipment down time is minimized.

It is an object of the present invention to provide an improved adjustable injection molding apparatus for creating of products within a mold from fluid plastic material wherein parts of many different sizes can be formed by the same injection molding apparatus.

It is an object of the present invention to provide an improved adjustable injection molding apparatus for creating of products within a mold from fluid plastic material wherein a fixed frame includes multiple fixed plates with a movable cage defined therein and a movable cylinder assembly mounted within the cage to facilitate equalizing among multiples of the apparatus of the invention of the hydraulic fluid utilized during each injection stroke.

It is an object of the present invention to provide an improved adjustable injection molding apparatus for creating of products within a mold from fluid plastic material wherein minor modifications of currently available injection molding apparatus is necessary in order to achieve the results of the present invention.

It is an object of the present invention to provide an improved adjustable injection molding apparatus for creating of products within a mold from fluid plastic material wherein the relative positioning between the nozzle body or tip opening and nozzle rod is indicated externally on the apparatus.

It is an object of the present invention to provide an improved adjustable injection molding apparatus for creating of products within a mold from fluid plastic material wherein the relative position between the nozzle rod end and the nozzle body or tip opening is indicated graphically on an icon plate fixedly secured to the fixed upper platen.

It is an object of the present invention to provide an improved adjustable injection molding apparatus for creating of products within a mold from fluid plastic material wherein a nozzle body icon is positioned on the icon plate adjacent to a rod wherein the icon rod includes a step therein to indicate the positioning of the nozzle rod end with respect to the nozzle body or tip opening icon depicted on the icon plate.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
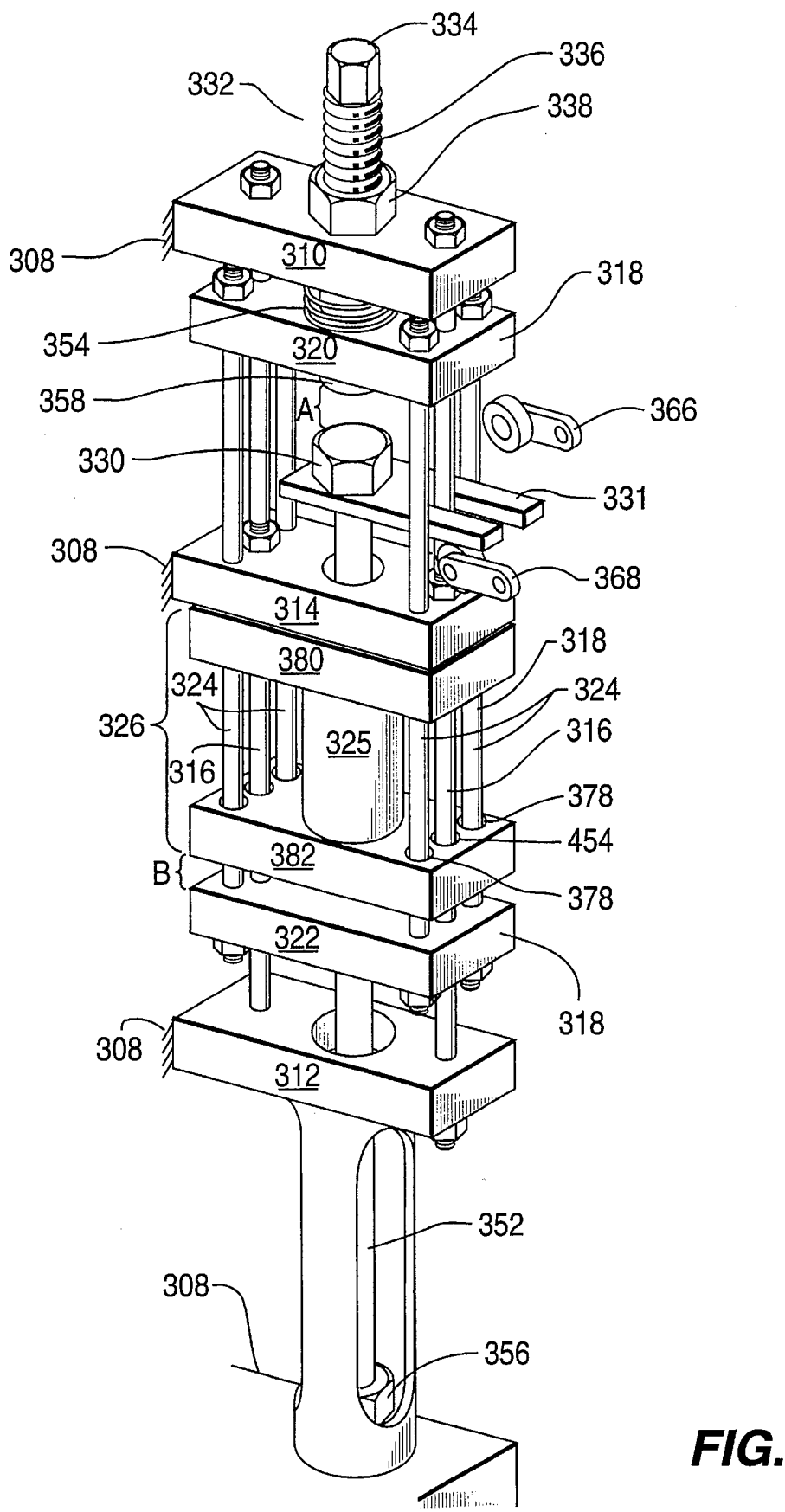
FIG. 1 is a perspective illustration of an embodiment of the injection molding apparatus of the present invention.

The present invention provides a novel means for allowing a hydraulic flow divider to be used for simultaneous actuation of a plurality of hydraulically actuated injectors in a multiple nozzle injection molding flow distribution apparatus. In order to make use of the advantages of a hydraulic flow divider, the total amount of fluid used by each of the connected injection piston/cylinder assemblies must be equal during each stroke. The apparatus of the present invention provides a novel means for assuring that each of the multiple injectors within an injector apparatus utilizes an equal amount of hydraulic drive fluid during each stroke. The unique design of the piston/cylinder drive configuration of each injector apparatus equalizes fluid used during each stroke, even though the actual stroke of the valve which controls polymer flow is infinitely adjustable between zero flow and wide open flow and is completely independent of all other valves serviced by the same hydraulic flow divider.

In this preferred embodiment many of the parts are described as "upper" and/or "lower" but it should be appreciated that such description is for illustration of this embodiment only and should not in any way be interpreted such as to limit the scope of this invention. Even the unit displayed in this preferred embodiment is completely capable of full operation in any chosen orientation whatsoever.

The device of the present invention includes a first fixed platen or fixed upper platen 310 and a second fixed platen or fixed lower platen 312 both immovable with respect to the frame means 308 designated by the hatched lines. A fixed intermediate member 314 is positioned therebetween and is preferably also immovable with respect to frame 308. In this embodiment, intermediate member 314 is fixedly secured at a specific position between platens 310 and 312 by preferably two fixed frame tie rods 316 or otherwise. Preferably the upper platen 310, intermediate member 314 and lower platen 312 are fixed secured to the fixed frame tie rods 316 and at positions spaced apart from one another.

Figure 2:
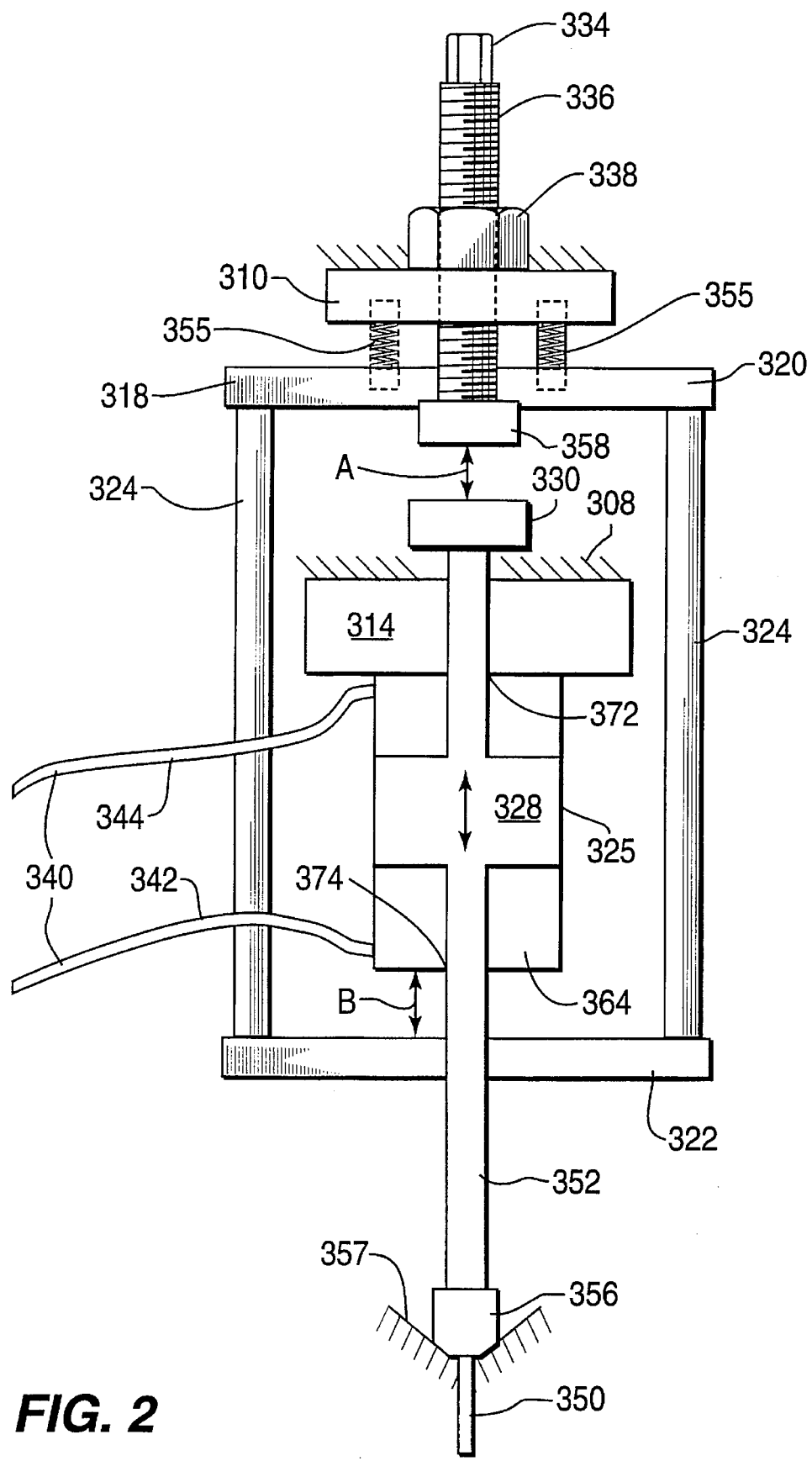
FIG. 2 is a side schematic illustration of an embodiment of the injection molding apparatus of the present invention.

Cage means 318 includes a first cage plate or upper cage plate 320, second cage plate or lower cage plate 322 and preferably four cage tie rods 324 extending therebetween for maintaining plates 320 and 322 spaced apart from one another. The complete cage assembly 318 is movably mounted on the fixed frame tie rods 316 extending between platens 310 and 312. The fixed frame tie rods 316 are utilized to facilitate secure positioning of the upper and lower platens 310 and 312 with respect to one another, and to allow the cage means 318 to be mounted thereon and easily move therealong adjustably. Movement of cage means 318 with respect to the fixed frame tie rods 316 is for the purpose of adjusting the stroke length of the nozzle rod 350 relative to the nozzle tip opening 376, while simultaneously creating an equal and opposite adjustment of stroke length of cylinder assembly 326 relative to frame 308 (and tip opening 376), thereby resulting in a zero net change in stroke length of rod 350 relative to cylinder assembly 326. A poppet member 356 can be utilized to interconnect cylinder rod 352 to nozzle rod 350 in an end-to-end relationship as shown in FIG. 2 so both parts move through equal stroke lengths.

The stroke length relative to the fixed frame 308 of the assembly including the nozzle rod 350, poppet 356 and hydraulic cylinder rod 352 is equal to gap "A" as depicted in FIG. 1. Adjustment of this stroke length is achieved by rotationally adjusting screw 336 which is in threaded engagement passing through fixed upper platen 312 and securable therewith by rotation of lock nut 338. Adjustment screw head 358 is on the underside of the upper cage plate 320 and is integral with adjustment screw 336. Screw 336 passes through a clearance hole in upper cage plate 320 such that the screw is free to pass through and the adjustment screw head 358 is not free to pass through. With this construction, the upper cage plate 320, as well as the entire cage assembly means 318, will be allowed to rest its weight plus the force of compression spring 354 upon the annular upper surface of the adjustment screw head 358. As the head 358 is adjusted by rotation thereof, the cage assembly 318 will follow the screw 336, thereby changing the dimension of gap "A" as desired.

It should be noted that in any other spatial orientation than that shown in this embodiment, that the force of gravity may have an effect on the force on the back side of the adjustment screw head and an alternate biasing means may be appropriate.

It is important to understand that whenever an adjustment is made which reduces the dimension of gap "A", then gap "B" will widen by an equal distance. Also, widening of gap "A" will reduce gap "B" by an equal amount.

Assuming that the dimensions of the mechanism are such that A+B=the nominal stroke of the hydraulic cylinder rod 352 in the cylinder assembly, then regardless of the adjustment setting, the full stroke of the rod 352 relative to the cylinder assembly will always occur. If the adjustment of "A" is zero, then "B" will be equal to the full cylinder stroke. For the purposes of illustration, let us assume that the nominal full stroke of hydraulic cylinder rod means 352 within the cylinder assembly 326 is "S". When viewing from the frame of reference of a stationary platform such as fixed lower platen 312 we see as follows:

A+B=S

A=the stroke of rod stop nut 330, hydraulic cylinder rod 352, poppet 356 and nozzle rod 350, with all parts moving together as one B=the stroke of hydraulic cylinder assembly 326 if A=0, then B=S, or if B=0, then A =S, and

A=S−B, and

B=S−A

The cylinder assembly 326 is vertically movably mounted on the fixed frame tie rod means 316 at a position between lower cage plate 322 and intermediate member 314. Cylinder assembly 326 preferably includes a first or upper cylinder plate 380 and a second or lower cylinder plate 382 spatially disposed from one another with said hydraulic cylinder means 325 extending therebetween. First cylinder plate 380 and second cylinder plate 382 preferably define apertures therein with bushings 454 positioned therein. The fixed frame tie rods 316 preferably extend through bushings 454 to allow said cylinder assembly 326 to be movably mounted thereon. Also, first cylinder plate 380 and second cylinder plate 382 define clearance holes 378 extending therethrough to allow the cage tie rods 324 to freely pass therethrough. The piston means 328 is fixedly secured to said cylinder rod means 352 at a position within the double ended cylinder bore 364 of cylinder means 325. The double ended cylinder bore 364 defines a first end opening or upper end opening means 372 and a second end opening or lower end opening means 374. The piston means 328 is captured within the cylinder bore 364 and is movable along with the cylinder rod 352 extending therethrough up and down from a position adjacent said first end opening 372 to a position adjacent said second end opening 374. The cylinder 325 is preferably a double ended cylinder with a cylinder rod 352 extending therethrough in both directions. A bumper member or rod stop nut 330 is fixedly secured to the upper end of the cylinder rod 352 to provide a durable stopping surface for abutment with adjustment screw head 358 responsive to movement thereof through the entire stroke distance "A". Member 330 can also be formed as a bolt means. Also a limit switch actuating plate 331 can be secured to the rod stop nut 330 to facilitate actuation of the first limit switch or upper limit switch 366 and the second limit switch or lower limit switch 368 to indicate the extreme limits of movement of hydraulic cylinder rod 352. Also with this configuration, the hydraulic cylinder rod 352 extends upwardly through the fixed intermediate member 314 and is freely movable therethrough.

Hydraulic cylinder rod 352 provides fixed interconnection between the nozzle rod 350 and the piston 328. Hydraulic powering fluid is supplied in this embodiment to the cylinder 325 in an area below the piston 328 through an hydraulic fluid conduit means 340 which may include a first conduit means 342 which effectively urges the piston 328 to move up within cylinder 325 thereby forcing similar movement of the nozzle rod 350 out of position within the tip opening 376 to initiate the flow of melted plasticized material therethrough. Hydraulic fluid conduit means 340 may also include a second conduit means 344 which is in fluid flow communication with respect to the interior of the cylinder 325 at a position above the piston 328. The application of pressurized fluid through the second conduit means 344 effectively urges the piston 328 to move down within the cylinder 325 thereby urging downward movement of the hydraulic cylinder rod 352 with the resulting downward movement of the nozzle rod 350 into the tip opening 376 causing the injector assembly to close and prevent the flow of melted plasticized material therethrough.

Each injector assembly is predesignated with a total maximum stroke distance equal to the sum of distance A between bumper or rod stop nut 330 and adjustment screw head 358 and distance B. The distance B is the distance between the lower surface of the second cylinder plate 382, and the upper surface of the lower cage plate 322. In this way, the total stroke of the cylinder rod 352 will always equal the total of A+B.

In operation, initially fluid will pass through the first conduit means 342 to fill the cylinder 325 below the piston 328 thereby urging piston 328 to move up until contact is achieved between bumper member 330 and stop member 358. Once this contact is made, no further upward movement of piston 328 is possible. However, hydraulic powering fluid flow will continue to flow through the first conduit means 342 until the total flow volume equals the one stroke required volume. The passage of hydraulic fluid through the first conduit means 342 will initially cause piston 328 to move to the maximum upward position, and thereafter will cause the cylinder assembly 326 to move down with respect to the cage 318. Cylinder assembly 326 will move downwardly since it is movably mounted upon the fixed frame tie rods 316 and the cage tie rods 324 until the cylinder assembly 326 contacts the upper surface of the lower cage plate 322. Once the piston 328 is moved to the maximum upward position and the cylinder 325 is moved to the maximum downward position, full stroke movement of the piston 328 with respect to the cylinder 325 is achieved and this is the definition of one full stroke and thereby it represents the one full stroke flow of powering hydraulic fluid through the complete stroke distance of A+B. Thus each time a full stroke is powered it will use the same total amount of hydraulic fluid despite the relative position of the adjustment screw 336. This is caused since adjustment will cause a change the stroke distance A which will be equally compensated for by a similar but opposite change in dimension B. That is, whenever the stroke distance is increased, that is, A is increased the cage 318 will move upwardly with respect to the cylinder rod 352 thereby causing an identical decrease in dimension B. In a similar manner any decrease in A will cause an identical increase in B. Thus the sum of A+B will always be constant thereby allowing use of the same volume of hydraulic fluid during each stroke.

In operation if adjustment is desired, the adjustment screw means 336 can be activated by its rotation caused by rotation of the adjustment screw hex-shaped end means 334 in a clockwise or counter clockwise direction. By rotating adjustment screw 336 such that the adjustment screw head 358 moves in a downward direction, the effect will be to decrease the distance A and to increase the distance B by an equal amount. However, the total of the distances will still remain equal. The effect of such an adjustment where A is decreased and B is increased will provide a shorter stroke of the nozzle rod 350 relative to any of the fixed members. It should be appreciated, however, that even when the shorter stroke of the nozzle rod and cylinder rod assembly is desired, that when A is decreased, B will be increased the identical amount thereby maintaining the total volume flow of powering fluid during the stroke to be equal regardless of the adjustment position of adjustment screw 336. When an adjustment is made by rotation of the adjustment screw hex-shaped end means 334, the cage 318 will be caused to move. The cage means 318 is biased in a downward direction away from the fixed upper platen 310 by a resilient biasing means 354 such as a compression spring which can encircle the shaft of the adjustment screw 336 as shown in FIG. 1 or can comprise multiple spring means 355 as shown in FIG. 2. This biasing means preferably comprises a compression spring which will tend to force movement of the cage 318 down if the adjustment means 332 is operated in such a manner as desired to decrease the stroke of the injector. It should be appreciated that the resilient biasing means 354 is not a required element of the apparatus of the present invention. Such springs are useful, however, for reducing unwanted clearances between parts that preferably are maintained in abutment with respect to one another such as the upper surface of adjustment screw head 358 and the lower surface of upper cage plate 320.

Thus, as long as each of the injector assemblies being utilized with a flow divider have the same total maximum fluid flow volume measurement, multiple injectors can be powered at different nonlinear positions by a hydraulic flow divider. This is only possible if the total of dimensions A and B are equal amongst all injector assemblies and we can see that the total amount of powering hydraulic fluid utilized by the injector assembly is constant, and is completely independent of the actual stroke to which the adjustment means 332 is adjusted. It should be appreciated that the diameter of the respect cylinders could be different as long as the measurement of A+B is chosen to accommodate the difference.

In order to return movement of the nozzle rod 350 to the lowermost position for halting the injection of plasticized material, the flow divider will supply an identical amount of powering fluid through the second conduit means 344. This powering fluid will move the piston 328 downwardly to the lowermost position thereof with poppet 356 at the lowermost position against poppet seat 357. The remaining fluid passing through the second conduit means 344 will then urge the cylinder 325 to move to the maximum upward position thereby achieving relative motion between piston 328 and cylinder 325 of a full stroke length A+B. Note that the cylinder will not move upwardly unless the nozzle rod comes down against a stop which stops the nozzle rod at the precise closed position. During the movement of the piston 328 and cylinder 325 the order of movement of the piston 328 and cylinder 325 is non-specific. That is, when fluid is initially passed through the first conduit means 342, the initial movement could be downward movement of the cylinder 325 followed by upward movement of the piston 328. Alternatively, the initial movement could be upward movement of the piston 328, followed by downward movement of the cylinder 325. There is no particular advantage of either order of movement. It only depends on static pressures, coefficients of friction, viscosity of the polymer being processed and the fit of the bearings within the apparatus of the injector. Two similar possibilities of movement exist during the downward stroke of movement of the nozzle rod 350 since the initial movement could be movement of the piston 328 down or movement of the cylinder 325 up. It really does not matter which one occurs first, it only matters that their motions have total the sum of distances A plus B.

Figure 3:
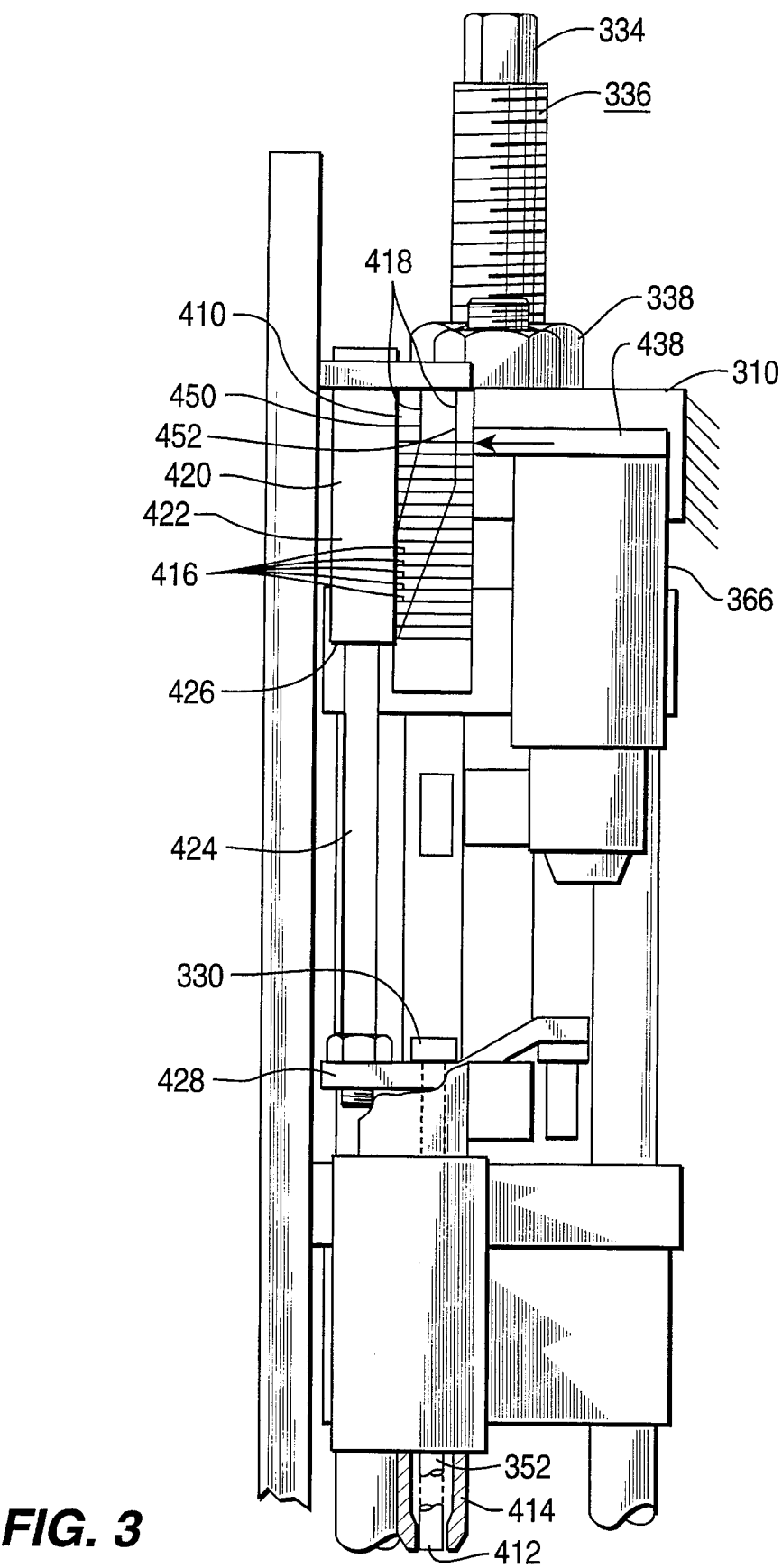
FIG. 3 is a side view of an embodiment of the injection molding apparatus of the present invention.
Figure 4:
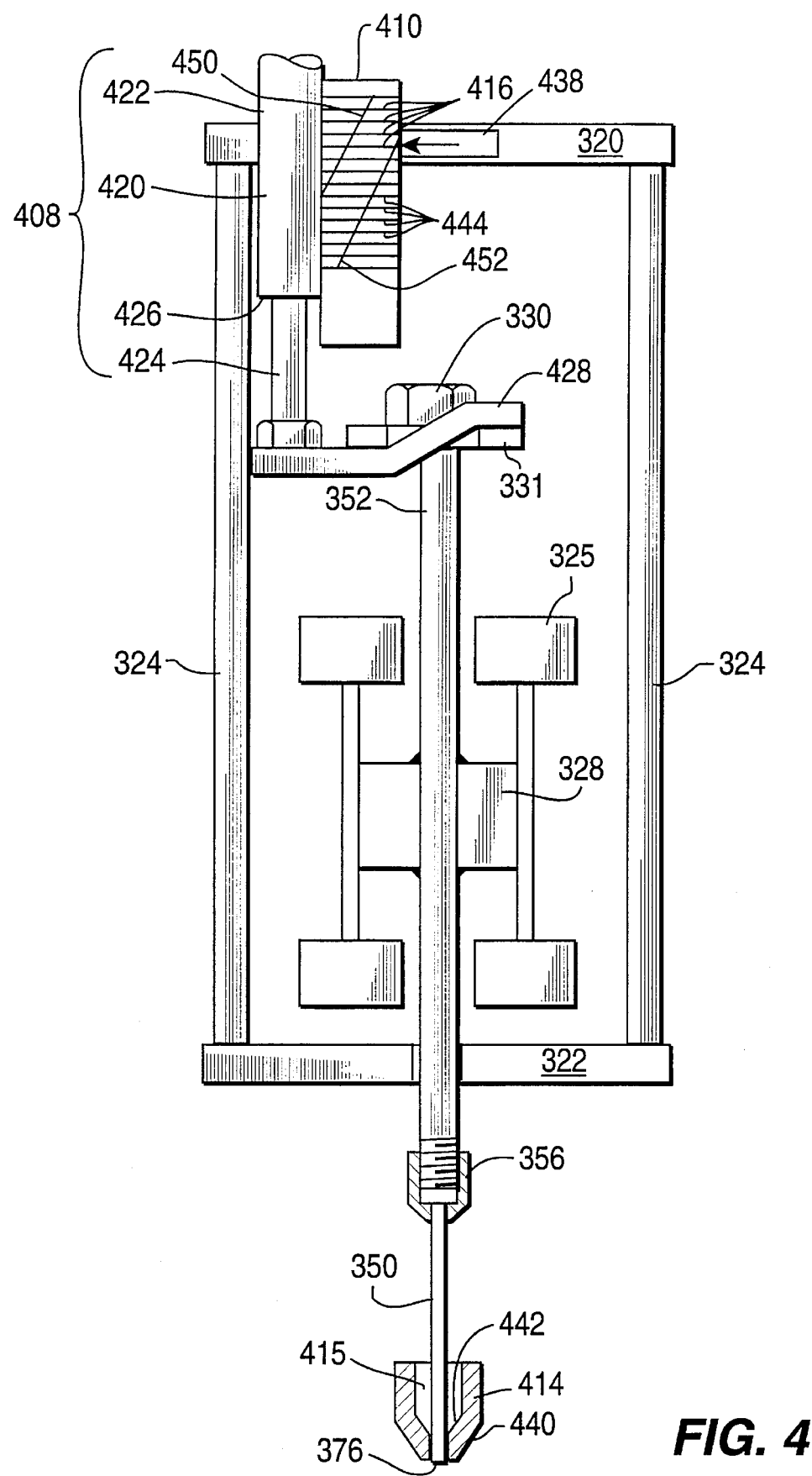
FIG. 4 is a side schematic view illustrating an embodiment of the position indicating apparatus of the present invention.

The present invention employs a unique feature that externally displays a graphical representation of the relative positions between the nozzle rod 350 and the nozzle body 414 defining a nozzle channel means 415 therein terminating at a tip opening 376 internally within the injection apparatus. This design makes use of position indicating means 408 including an icon plate 410 which preferably includes a marked means 444 thereon including a nozzle body tip area icon 418 depicted thereon, as well as a plurality of scale marks 416 to facilitate more detailed measurement. The icon plate 410 is affixed to a stationary part of the frame 308 so it can represent the icon of the nozzle body 414 and tip opening 376 which is stationary. The nozzle body icon 418 displayed on icon plate 410 includes two individual lines. As shown in FIGS. 3 and 4 the line to the right represents the outer nozzle body profile 440, whereas the line to the left represents the inner nozzle body profile 442. In this manner the complete inner and outer profile of the nozzle body 414 in the area thereof adjacent the end of the nozzle rod 350 is completely represented.

Figure 5:
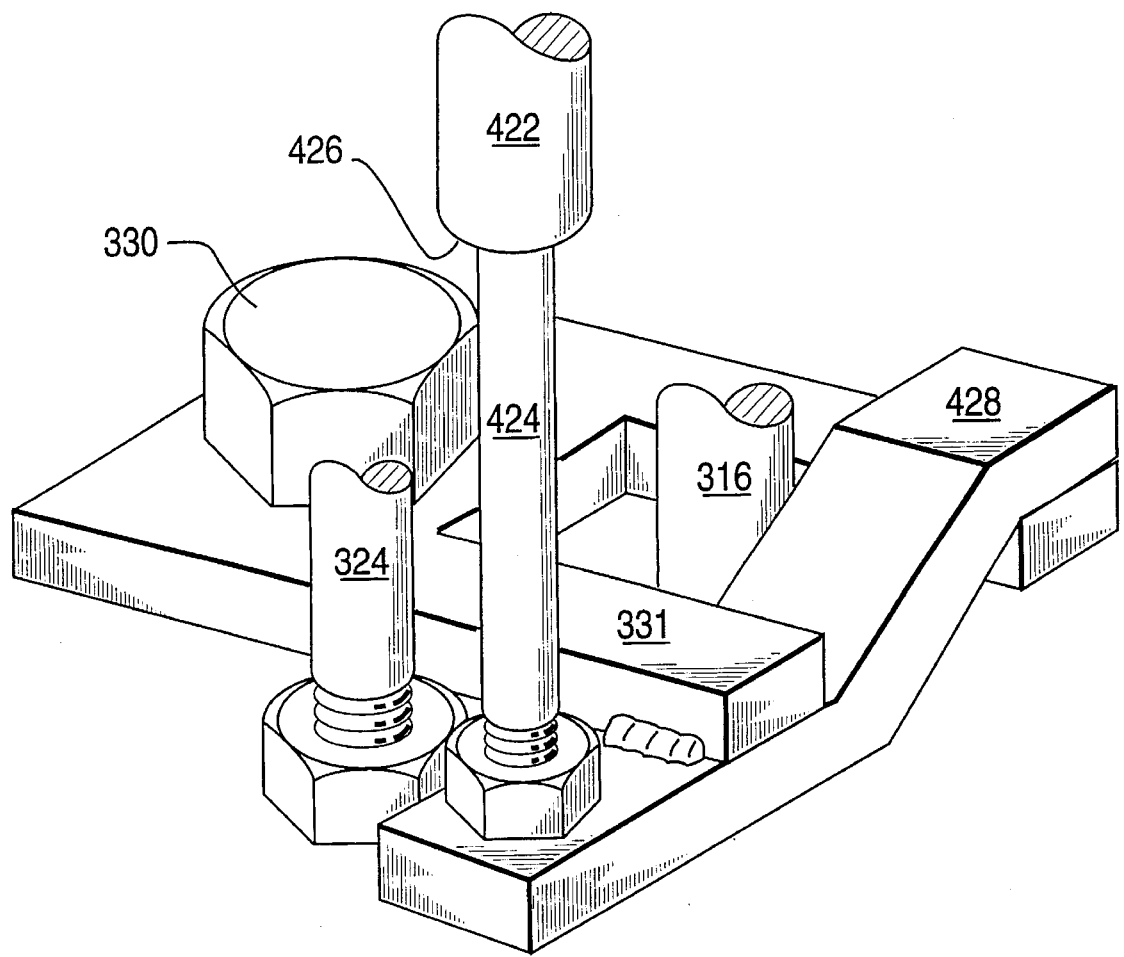
FIG. 5 is a perspective illustration of the interconnection between the icon rod and the limit switch actuating plate extension which causes the icon rod to move simultaneously along with the nozzle rod for facilitating indication of positioning thereof externally on the icon plate.

Immediately adjacent to the nozzle body icon 418 is an icon rod 420 including a first or upper icon rod section 422 having a large diameter, and a second or lower icon rod section 424 of a smaller rod diameter. The icon rod 420 includes a rod step 426 in between the two different size rod icon sections 422 and 424. The icon rod 420 is secured, preferably at the lower end thereof, to a limit switch actuating plate extension 428 as shown best in FIG. 5. The rod stop nut 330 is secured to the upper end of the hydraulic cylinder rod 352 with a limit switch actuating plate 331 secured thereto. As shown in FIG. 5 plate 331 is secured between rod stop nut 330 and hydraulic cylinder rod 352 to which it is attached. Limit switch actuating plate 331 travels with the rod stop nut 330 and hydraulic cylinder rod 352 during an injection molding stroke and is positioned to trip upper limit switch 366 at one extreme end of the stroke distance and to trip lower limit switch 368 at the other extreme end of the stroke distance to indicate those extreme positions. A limit switch actuating plate extension is preferably secured thereto and oriented extending outwardly therefrom to facilitate mounting thereto of said lower rod section 424 of said icon rod 420. Thus, the icon rod 420 will move along with the hydraulic cylinder rod during each cycle of injection stroke movement thereof. Also, icon rod 420 will similarly move along with the hydraulic cylinder rod 352 during any adjustment movement of the nozzle rod 350 with respect to the nozzle body 414. Thus, any movement or adjustment of nozzle rod 350 will result in similar movement of the icon rod 420, and also the rod step 426 located thereon.

In the graphical representation, the rod step 426 represents the lowermost end of the tip of nozzle rod 350 such that it will align with the lowermost end of the inner nozzle body profile icon 452 whenever the nozzle rod 350 is actually positioned immediately adjacent to the lowermost end of the nozzle body 414. If adjustment, or movement during operation, of the nozzle rod 350 with respect to the nozzle body 414 occurs, then a similar relative movement will occur between the rod step 426 and the nozzle body icon 418 depicted on the icon plate 410 by the inner nozzle body profile icon 442 and the outer nozzle body profile icon 440. In this manner, an operator will have increased knowledge of the operation of the system and the adjustment position of the system at all times, and even during operation, since the actual position of the nozzle rod 350 with respect to the nozzle body 414 will be graphically represented externally on the apparatus. The apparatus as shown includes the conventional upper limit switch 366 and lower limit switch 368 as shown in FIG. 1.

A pointer means 438 is preferably mounted on the cage assembly means 318 in a position adjacent the scale markings 416 on icon plate 410 to indicate the adjustment setting of adjustment means 332. As the cage 318 and the adjustment screw 336 are manually adjusted in either direction, the pointer 438 will travel therewith and move relative to icon plate 410 to vary the depicted setting of adjustment displayed. The position of the pointer 438 indicates the exact scale marking to which the icon rod step 426 will rise when the nozzle and rod assembly is open to the maximum extent that the adjustment setting will allow.

In summary, we see that the relationship between the working nozzle rod 350 and the nozzle body 414 is shown graphically by the relationship between the rod step 426 and the nozzle body icon 418. Whereas, the position of adjustment of the depth of the stroke is graphically represented with respect to the icon plate 410 by the position of the pointer 438 with respect thereto due to the fact that pointer 438 is physically fixed with respect to the cage 318 and moves with it during adjustment by rotation of adjustment screw 336. It should be appreciated that adjustment of the icon rod 418 up or down in the actuating plate extension 428 at the time of set-up should be adequate, and should assume that the nozzle body 414 and the tip of the nozzle rod 350 will be flush with each other at start up.

The specific configuration of the limit switch actuating plate 331 and the extension 428 thereof can be of any conventional design. For example, the extension 428 and the plate 331 could be formed as a single integral unit or piece with appropriate apertures defined therein for securement to stop nut 330, securement to icon rod 420 as well as providing full clearance for a fixed frame tie rod 316 passing closely thereadjacent.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An adjustable injection molding apparatus for creating products within a mold from fluid plastic material comprising:

A. a frame including:
  (1) a first fixed platen;
  (2) a second fixed platen spatially disposed from said first fixed platen;
  (3) a fixed frame tie rod fixedly secured to said first fixed platen and to said second fixed platen and extending therebetween;
  (4) a fixed intermediate member secured to said fixed frame tie rod at an intermediate position between said first fixed platen and said second fixed platen and spatially disposed from both;

B. a cage comprising:
  (1) a first cage plate movably mounted on said fixed frame tie rod between said fixed intermediate member and said first fixed platen and movable therebetween;
  (2) a second cage plate movably mounted on said fixed frame tie rod between said fixed intermediate member and said second fixed platen spatially disposed from said first cage plate and movable therebetween;
  (3) a cage tie rod fixedly secured to said first cage plate and to said second cage plate and extending therebetween;

C. a hydraulic cylinder assembly movably mounted on said fixed frame tie rod between said fixed intermediate member and said second cage plate to be movable therebetween, said hydraulic cylinder assembly defining a cylinder bore extending therethrough, said hydraulic cylinder assembly defining a first end opening and a second end opening at positions in said cylinder bore spatially disposed from one another;

D. a hydraulic cylinder rod movable with respect to said hydraulic cylinder assembly and extending through said cylinder bore thereof and through said first end opening thereof and said second end opening, said hydraulic cylinder rod including a bumper secured there outside of said cylinder bore adjacent said first end opening thereof;

E. a nozzle rod means attached to said hydraulic cylinder rod and extending outwardly away therefrom and being movable therewith;

F. a nozzle body attached with respect to said frame, said nozzle body defining a nozzle channel means therethrough to facilitate dispensing thermoplastic material therethrough, said nozzle body further defining a tip opening means therein in fluid flow communication with respect to said nozzle channel means to facilitate dispensing thermoplastic material therethrough, said nozzle rod means being movably mounted within said nozzle channel means for selectively allowing and preventing dispensing therethrough, said nozzle rod means being selectively positionable with respect to said tip opening means to prevent dispensing therefrom when positioned therein;

G. a piston means fixedly secured to said hydraulic cylinder rod at a position within said cylinder bore, said piston means being reciprocally movable within said cylinder bore between a position adjacent said first end opening with said nozzle rod means in an open position with respect to said tip opening means to allow dispensing therethrough and a position adjacent said second end opening with said nozzle rod means in a closed position with respect to said tip opening means to prevent dispensing therethrough;

H. an adjustment means for varying the length of the stroke of said piston means relative to said frame, said adjustment means including:
  (1) an adjustment screw means extending through said first fixed platen and through said first cage plate, said adjustment screw means being in threaded engagement with respect to said first fixed platen to be adjustably positionable extending therethrough and to vary the distance between said first fixed platen and said first cage plate;
  (2) an adjustment screw head means positioned in abutment with said first cage plate at a position thereon opposite from said first fixed plate to limit movement of said first cage plate away from said first fixed platen, said adjustment screw head means being spatially disposed from said bumper by a distance equal to the stroke length of said piston means, said adjustment screw means being rotatable to adjust the relative positioning of said adjustment screw head means with respect to said bumper to adjust the stroke length of said piston means;

I. a first limit switch fixedly secured to said cage, said first limit switch being adapted to be actuated to indicate movement of said nozzle rod means to the adjustably open position with respect to said tip opening means;

J. a second limit switch fixedly secured to said frame at a position spatially disposed from said first limit switch, said second limit switch being adapted to be actuated to indicate movement of said nozzle rod means to the fully closed position with respect to said tip opening means;

K. a limit switch actuating plate secured to said hydraulic cylinder rod adjacent said bumper to be movable therewith, said limit switch actuating plate being movable with said hydraulic cylinder rod to a position adjacent to said first limit switch for actuating thereof responsive to movement of said nozzle rod means to the adjustably open position relative to said tip opening means, said limit switch actuating plate also being movable with said hydraulic cylinder rod to a position adjacent to said second limit switch for actuating thereof responsive to movement of said nozzle rod means to the fully closed position relative to said tip opening means; and L. an hydraulic fluid conduit means in fluid flow communication with respect to said hydraulic cylinder assembly to supply a fixed amount of hydraulic fluid for one operational stroke into said cylinder bore during each operational stroke of the injection molding apparatus, the hydraulic fluid for each stroke being operative to drive said piston means and said hydraulic cylinder rod toward said adjustment screw head means until said bumper moves into abutment therewith and also being operative to drive said hydraulic cylinder assembly toward said second cage plate for abutment therewith.

2. An adjustable injection molding apparatus for creating products within a mold from fluid plastic material as defined in claim 1 wherein said hydraulic cylinder assembly further comprises;
  (1) a first cylinder plate movably mounted on said fixed frame tie rod between said fixed intermediate member and said second cage plate, said first cylinder plate being fixedly secured to said hydraulic cylinder assembly adjacent said first end opening thereof, said first cylinder plate being movable to a position into abutment with said fixed intermediate member; and
  (2) a second cylinder plate movably mounted on said fixed frame tie rod between said fixed intermediate member and said second cage plate and spatially disposed from said first cylinder plate, said second cylinder plate being fixedly secured to said hydraulic cylinder assembly adjacent said second end opening thereof and spatially disposed from said first cylinder plate, said second cylinder plate being movable to a position into abutment with respect to said second cage plate.

3. An adjustable injection molding apparatus for creating products within a mold from fluid plastic material as defined in claim 1 wherein said adjustment means further includes a biasing means positioned between said first cage plate and said first fixed platen for urging said first cage plate and said first fixed platen apart.

4. An adjustable injection molding apparatus for creating products within a mold from fluid plastic material as defined in claim 3 wherein said biasing means comprises a compression spring extending about said adjustment screw means extending between said first fixed platen and said first cage plate.

5. An adjustable injection molding apparatus for creating products within a mold from fluid plastic material as defined in claim 3 wherein said biasing means comprises at least two spring means in abutment with said first cage plate and said first fixed platen for urging said first cage plate and said first fixed platen apart.

6. An adjustable injection molding apparatus for creating products within a mold from fluid plastic material as defined in claim 1 further comprising a poppet means secured to said hydraulic cylinder rod and said nozzle rod means for facilitating interconnection therebetween and a poppet seat means fixedly secured to said frame, said poppet means being selectively engageable with respect to said poppet seat means, said poppet seat means providing a closed position stop for the poppet means, where the poppet means seals around said nozzle rod when the poppet means engages the poppet seat means at said closed position.

7. An adjustable injection molding apparatus for creating products within a mold from fluid plastic material as defined in claim 1 wherein said adjustment means further includes an adjustment screw lock nut means positioned adjacent to said first fixed platen to provide a locking means for threaded engagement between said adjustment screw means and said first fixed platen.

8. An adjustable injection molding apparatus for creating products within a mold from fluid plastic material as defined in claim 1 wherein said adjustment means further includes a hex-shaped adjustment end means on said adjustment screw means adjacent said first fixed platen to facilitate rotational movement of said adjustment screw means for adjusting stroke length.

9. An adjustable injection molding apparatus for creating products within a mold from fluid plastic material as defined in claim 1 wherein said cage tie rods means comprises four cage tie rods extending between said first cage plate and said second cage plate.

10. An adjustable injection molding apparatus for creating products within a mold from fluid plastic material as defined in claim 1 wherein said first cage plate and said second cage plate define clearance holes extending therethrough with said fixed frame tie rod extending freely therethrough.

11. An adjustable injection molding apparatus for creating products within a mold from fluid plastic material as defined in claim 1 wherein said fixed intermediate member define clearance holes extending therethrough with said cage tie rod extending freely therethrough.

12. An adjustable injection molding apparatus for creating products within a mold from fluid plastic material as defined in claim 1 wherein said hydraulic fluid conduit means includes a first conduit means in fluid flow communication with said cylinder bore on one side of said piston means and includes a second conduit means in fluid flow communication with said cylinder bore on the opposite side of said piston means from said first conduit means.

13. An adjustable injection molding apparatus for creating products within a mold from fluid plastic material as defined in claim 1 further comprising a position indicating means including:
  A. an icon plate means fixedly secured to said first fixed platen of said frame, said icon plate including marked means thereon to facilitate indicating of relative positioning between said nozzle rod means and said nozzle body;
  B. a limit switch actuating plate extension fixedly secured to said limit switch actuating plate and extending outwardly therefrom and being movable therewith; and
  C. an icon rod fixedly secured to said limit switch actuating plate extension and extending outwardly therefrom to a position adjacent to said marked means on said icon plate means to facilitate indicating of relative positioning between said nozzle rod means and said nozzle body, said icon rod being movable with said hydraulic cylinder rod.

14. An adjustable injection molding apparatus for creating products within a mold from fluid plastic material as defined in claim 13 wherein said limit switch actuating plate extension is fixedly secured between said bumper and said hydraulic cylinder rod to be movable therewith.

15. An adjustable injection molding apparatus for creating products within a mold from fluid plastic material as defined in claim 13 wherein said icon rod includes a first icon rod section and a second icon rod section being coaxial with respect to one another, said second icon rod section being fixedly secured to said limit switch actuating plate extension, said first icon rod section being larger in diameter than said second icon rod section to define a step means therebetween, said step means being positioned adjacent said marked means defined on said icon plate means for representing positioning of said nozzle rod means thereagainst.

16. An adjustable injection molding apparatus for creating products within a mold from fluid plastic material as defined in claim 15 wherein said icon rod extends generally parallel with respect to said hydraulic cylinder rod and said nozzle rod means.

17. An adjustable injection molding apparatus for creating products within a mold from fluid plastic material as defined in claim 13 further comprising a pointer means fixedly secured with respect to said cage to be movable therewith, said pointer means being positioned adjacent said marked means of said icon plate to indicate the position to which the nozzle rod will move when opened to the adjustably open position.

18. An adjustable injection molding apparatus for creating products within a mold from fluid plastic material as defined in claim 13 wherein said marked means on said icon plate means includes scale marks to facilitate adjustment positioning.

19. An adjustable injection molding apparatus for creating products within a mold from fluid plastic material as defined in claim 13 wherein said marked means includes an inner nozzle body profile icon and an outer nozzle body profile icon to represent the relative positioning between said nozzle body and said nozzle rod means.

20. An adjustable injection molding apparatus for creating products within a mold from fluid plastic material comprising:
  A. a frame including:
    (1) a first fixed platen fixedly secured with respect to said frame;
    (2) a second fixed platen fixedly secured with respect to said frame spatially disposed from said first fixed platen;
    (3) a fixed frame tie rod fixedly secured to said first fixed platen and to said second fixed platen and extending therebetween;
    (4) a fixed intermediate member secured to said fixed frame tie rod at an intermediate position between said first fixed platen and said second fixed platen and spatially disposed from both;
  B. a cage comprising:
    (1) a first cage plate movably mounted on said fixed frame tie rod between said fixed intermediate member and said first fixed platen and movable therebetween;
    (2) a second cage plate movably mounted on said fixed frame tie rod between said fixed intermediate member and said second fixed platen spatially disposed from said first cage plate and movable therebetween;
    (3) a cage tie rod fixedly secured to said first cage plate and to said second cage plate and extending therebetween, said cage tie rod including four cage tie rods extending between said first cage plate and said second cage plate;
  C. a hydraulic cylinder assembly movably mounted on said fixed frame tie rod between said fixed intermediate member and said second cage plate to be movable therebetween, said hydraulic cylinder assembly including:
    (1) a hydraulic cylinder assembly defining a cylinder bore extending therethrough, said hydraulic cylinder assembly defining a first end opening and a second end opening at positions in said cylinder bore spatially disposed from one another;
    (2) a first cylinder plate movably mounted on said fixed frame tie rod between said fixed intermediate member and said second cage plate, said first cylinder plate being fixedly secured to said hydraulic cylinder assembly adjacent said first end opening thereof, said first cylinder plate being movable to a position into abutment with said fixed intermediate member;

(3) a second cylinder plate movably mounted on said fixed frame tie rod between said fixed intermediate member and said second cage plate and spatially disposed from said first cylinder plate, said second cylinder plate being fixedly secured to said hydraulic cylinder assembly adjacent said second end opening thereof and spatially disposed from said first cylinder plate, said second cylinder plate being movable to a position into abutment with respect to said second cage plate;

D. a hydraulic cylinder rod movable with respect to said hydraulic cylinder assembly and extending through said cylinder bore thereof and through said first end opening thereof and said second end opening, said hydraulic cylinder rod including a bumper secured thereon outside of said cylinder bore adjacent said first end opening thereof;

E. a nozzle rod means attached to said hydraulic cylinder rod and extending outwardly away therefrom and being movable therewith;

F. a nozzle body attached with respect to said frame, said nozzle body defining a nozzle channel means therethrough to facilitate dispensing thermoplastic material therethrough, said nozzle body further defining a tip opening means therein in fluid flow communication with respect to said nozzle channel means to facilitate dispensing thermoplastic material therethrough, said nozzle rod means being movably mounted within said nozzle channel means for selectively allowing and preventing dispensing therethrough, said nozzle rod means being selectively positionable with respect to said tip opening means to prevent dispensing therefrom when positioned therein;

G. a piston means fixedly secured to said hydraulic cylinder rod at a position within said cylinder bore, said piston means being reciprocally movable within said cylinder bore between a position adjacent said first end opening with said nozzle rod means in an open position with respect to said tip opening means to allow dispensing therethrough and a position adjacent said second end opening with said nozzle rod means in a closed position with respect to said tip opening means to prevent dispensing therethrough;

H. an adjustment means for varying the length of the stroke of said piston means with respect to said frame, said adjustment means including:

(1) an adjustment screw lock nut means positioned adjacent said first fixed platen and defining a threaded aperture therethrough;

(2) an adjustment screw means extending through said threaded aperture, said first fixed platen and said first cage plate, said adjustment screw means being in threaded engagement with respect to said first fixed platen to be adjustably positionable extending therethrough and to vary the distance between said first fixed platen and said first cage plate;

(3) an adjustment screw head means positioned in abutment with said first cage plate at a position thereon opposite from said first fixed plate to limit movement of said first cage plate away from said first fixed platen, said adjustment screw head means being spatially disposed from said bumper by a distance equal to the stroke length of said piston means relative to said frame, said adjustment screw means being rotatable to adjust the relative positioning of said adjustment screw head means with respect to said bumper to adjust the stroke length of said piston means;

(4) a compression spring biasing means extending round said adjustment screw means between said first fixed platen and said first cage plate for urging same apart;

(5) a hex-shaped adjustment end means secured on said adjustment screw means adjacent said first fixed platen to facilitate rotational control of movement of said adjustment screw means for adjusting stroke length;

I. a first limit switch fixedly secured to said cage, said first limit switch being adapted to be actuated to indicate movement of said nozzle rod means to the adjustably open position with respect to said tip opening means;

J. a second limit switch fixedly secured to said frame at a position spatially disposed from said first limit switch, said second limit switch being adapted to be actuated to indicate movement of said nozzle rod means to the fully closed position with respect to said tip opening means;

K. a limit switch actuating plate secured to said hydraulic cylinder rod adjacent said bumper to be movable therewith, said limit switch actuating plate being movable with said hydraulic cylinder rod to a position adjacent to said first limit switch for actuating thereof responsive to movement of said nozzle rod means to the adjustably open position relative to said tip opening means, said limit switch actuating plate also being movable with said hydraulic cylinder rod to a position adjacent to said second limit switch for actuating thereof responsive to movement of said nozzle rod means to the fully closed position relative to said tip opening means;

L. an hydraulic fluid conduit means in fluid flow communication with respect to said hydraulic cylinder assembly to supply a fixed amount of hydraulic fluid for one operational stroke into said cylinder bore during each operational stroke of the injection molding apparatus, the hydraulic fluid for each stroke being operative to drive said piston means and said hydraulic cylinder rod toward said adjustment screw head means until said bumper moves into abutment therewith and also being operative to drive said hydraulic cylinder assembly toward said second cage plate for abutment therewith, said hydraulic fluid conduit means including:

(1) a first conduit means in fluid flow communication with said cylinder bore on one side of said piston means;

(2) a second conduit means in fluid flow communication with said cylinder bore on the opposite side of said piston means from said first conduit means;

M. a poppet seat means fixedly secured to said frame;

N. a poppet means secured to said hydraulic cylinder rod and said nozzle rod means for facilitating securement therebetween, said poppet means also being engageable and movable with respect to said poppet seat means to provide a stop for said poppet means;

O. a position indicating means including:

(1) an icon plate means fixedly secured to said first fixed platen of said frame, said icon plate including marked means thereon to facilitate indicating of relative positioning between said nozzle rod means and said nozzle body, said marked means including;
  (a) equally spaced lining to facilitate adjustment positioning;
  (b) an inner nozzle body profile icon to facilitate display of relative positioning of said nozzle body with respect to said nozzle rod means;
  (c) an outer nozzle body profile icon to further represent the relative positioning between said nozzle body and said nozzle rod means;
(2) a limit switch actuating plate extension fixedly secured to said limit switch actuating plate and extending outwardly therefrom and being movable therewith, said limit switch actuating plate extension being fixedly secured between said bumper and said hydraulic cylinder rod to be movable therewith;
(3) an icon rod fixedly secured to said limit switch actuating plate extension and extending outwardly therefrom to a position adjacent to said marked means on said icon plate means to facilitate indicating of relative positioning between said nozzle rod means and said nozzle body, said icon rod extending generally parallel with respect to said hydraulic cylinder rod and said nozzle rod means, said icon rod being movable with said hydraulic cylinder rod, said icon rod including:
  (a) a first icon rod section;
  (b) a second icon rod section being oriented coaxially with respect to one another, said second icon rod section being fixedly secured to said limit switch actuating plate extension, said second icon rod section being smaller in diameter than said first icon rod section;
  (c) a step means defined between said first icon rod section and said second icon rod section resulting from the difference in relative diameter therebetween, said step means being positioned adjacent said marked means defined on said icon plate means for representing positioning of said nozzle rod means thereagainst; and
(4) a pointer means fixedly secured with respect to said cage to be movable therewith, said pointer means being positioned adjacent said marked means of said icon plate to indicate relative adjustment positioning between said nozzle rod means and said nozzle body.

* * * * *